US007344988B2

(12) United States Patent
Chelle

(10) Patent No.: US 7,344,988 B2
(45) Date of Patent: Mar. 18, 2008

(54) ALUMINA ABRASIVE FOR CHEMICAL MECHANICAL POLISHING

(75) Inventor: Philippe H. Chelle, Fremont, CA (US)

(73) Assignee: DuPont Air Products Nanomaterials LLC, Tempe, AZ (US)

(*) Notice: Subject to any disclaimer, the term of this patent is extended or adjusted under 35 U.S.C. 154(b) by 0 days.

(21) Appl. No.: 10/972,616

(22) Filed: Oct. 26, 2004

(65) Prior Publication Data

US 2005/0194358 A1 Sep. 8, 2005

Related U.S. Application Data

(60) Provisional application No. 60/526,107, filed on Dec. 2, 2003, provisional application No. 60/514,020, filed on Oct. 27, 2003.

(51) Int. Cl.
*H01L 21/302* (2006.01)
(52) U.S. Cl. .................. 438/692; 438/690; 438/691; 438/693; 252/79.1; 252/79.2; 216/53; 216/89; 423/111; 423/625; 51/298; 51/307
(58) Field of Classification Search ........ 438/690–693; 252/79.1, 79.2; 216/53, 89; 423/111, 625; 51/298, 307
See application file for complete search history.

(56) References Cited

U.S. PATENT DOCUMENTS

| | | | |
|---|---|---|---|
| 3,957,698 A * | 5/1976 | Hatch ............... | 521/28 |
| 4,395,348 A | 7/1983 | Lee | |
| 4,824,763 A | 4/1989 | Lee | |
| 5,279,771 A | 1/1994 | Lee | |
| 5,334,332 A | 8/1994 | Lee | |
| 5,381,807 A | 1/1995 | Lee | |
| 5,399,464 A | 3/1995 | Lee | |
| 5,482,566 A | 1/1996 | Lee | |
| 5,489,233 A | 2/1996 | Cook et al. | |
| 5,672,577 A | 9/1997 | Lee | |
| 5,891,205 A | 4/1999 | Picardi et al. | |
| 5,902,780 A | 5/1999 | Lee | |
| 5,911,835 A | 6/1999 | Lee et al. | |
| 5,958,794 A | 9/1999 | Bruxvoort et al. | |
| 5,981,454 A | 11/1999 | Small | |
| 6,000,411 A | 12/1999 | Lee | |
| 6,015,506 A * | 1/2000 | Streinz et al. ........ | 252/186.1 |
| 6,117,783 A | 9/2000 | Small et al. | |
| 6,121,217 A | 9/2000 | Lee | |
| 6,140,287 A | 10/2000 | Lee | |
| 6,156,661 A | 12/2000 | Small | |
| 6,187,730 B1 | 2/2001 | Lee | |
| 6,221,818 B1 | 4/2001 | Lee | |
| 6,235,693 B1 | 5/2001 | Cheng et al. | |
| 6,242,400 B1 | 6/2001 | Lee | |
| 6,248,704 B1 | 6/2001 | Small et al. | |
| 6,251,150 B1 | 6/2001 | Small et al. | |
| 6,276,372 B1 | 8/2001 | Lee | |
| 6,313,039 B1 | 11/2001 | Small et al. | |
| 6,367,486 B1 | 4/2002 | Lee et al. | |
| 2001/0037821 A1* | 11/2001 | Staley et al. ........ | 134/25.4 |
| 2004/0006924 A1* | 1/2004 | Scott et al. ........ | 51/307 |

OTHER PUBLICATIONS

S.Wold, Silicon Processing for the VLSI Era. vol. 4, Lattice Press (2002), pp. 368-370, 402 and 405.*

* cited by examiner

*Primary Examiner*—Binh X. Tran
*Assistant Examiner*—Maki Angadi
(74) *Attorney, Agent, or Firm*—Morgan Lewis & Bockius LLP

(57) ABSTRACT

Methods of manufacturing alumina abrasive for use in chemical mechanical polishing are described, wherein the abrasive is in a slurry having gamma alumina formed in a low temperature fuming process, water, an acid sufficient to maintain the pH below about 7, wherein the slurry does not settle appreciably in an 8 to 24 hour period. Advantageously, the alumina is wet-milled without the use of wet-milling salt additives.

25 Claims, No Drawings

ALUMINA ABRASIVE FOR CHEMICAL MECHANICAL POLISHING

CROSS REFERENCE TO RELATED APPLICATION

This is a utility application based on Provisional Ser. No. 60/514,020, filed Oct. 27, 2003, and U.S. Provisional Ser. No. 60/526,107 filed Dec. 2, 2003, the entire applications of which are incorporated herein by reference for all purposes.

FIELD OF THE INVENTION

This invention relates to methods of manufacturing alumina abrasive for use in chemical mechanical polishing, and to use of the abrasive in chemical mechanical polishing.

BACKGROUND OF THE INVENTION

Conventional polishing systems and polishing methods typically are not entirely satisfactory at planarizing semiconductor wafers. In particular, polishing compositions and polishing pads can have less than desirable polishing rates, and their use in chemically-mechanically polishing semiconductor surfaces can result in poor surface quality. Because the performance of a semiconductor wafer is directly associated with the planarity of its surface, it is crucial to use a polishing composition and method that results in a high polishing efficiency, uniformity, and removal rate, and leaves a high quality polish with minimal surface defects.

The difficulty in creating an effective polishing system for semiconductor wafers stems from the complexity of the semiconductor wafer. Semiconductor wafers are typically composed of a substrate, on which a plurality of transistors has been formed. Integrated circuits are chemically and physically connected into a substrate by patterning regions in the substrate and layers on the substrate. To produce an operable semiconductor wafer and to maximize the yield, performance, and reliability of the wafer, it is desirable to polish select surfaces of the wafer without adversely affecting underlying structures or topography. In fact, various problems in semiconductor fabrication can occur if the process steps are not performed on wafer surfaces that are adequately planarized.

A variety of chemical mechanical polishing and/or residue removal compositions and processes suitable for integrated circuit fabrication have been developed and marketed by EKC Technology, Inc. (hereinafter "EKC"), the assignee of the present application. Some of these compositions and processes are also useful for removing photoresist, polyimide, or other polymeric layers from substrates in integrated circuit fabrication, and EKC has also developed a variety of compositions and processes specifically for removing such polymeric layers from substrates in integrated circuit fabrication. Additionally, EKC has developed a variety of compositions and processes to selectively remove specific substrate compositions from a substrate surface at a controlled rate. Such compositions and processes are disclosed in the following commonly assigned issued patents:

U.S. Pat. No. 6,367,486 to Lee et al., which issued on Apr. 9, 2002, entitled Ethylenediaminetetraacetic acid or its ammonium salt semiconductor process residue removal process;

U.S. Pat. No. 6,313,039 to Small et al., which issued on Nov. 6, 2001, entitled Chemical mechanical polishing composition and process;

U.S. Pat. No. 6,276,372 to Lee, which issued on Aug. 21, 2001, entitled Process using hydroxylamine-gallic acid composition;

U.S. Pat. No. 6,251,150 to Small et al., which issued on Jun. 26, 2001, entitled Slurry composition and method of chemical mechanical polishing using same;

U.S. Pat. No. 6,248,704 to Small et al., which issued on Jun. 19, 2001, entitled Compositions for cleaning organic and plasma etched residues for semiconductors devices;

U.S. Pat. No. 6,242,400 to Lee, which issued on Jun. 5, 2001, entitled Method of stripping resists from substrates using hydroxylamine and alkanolamine;

U.S. Pat. No. 6,235,693 to Cheng et al., which issued on May 22, 2001, entitled Lactam compositions for cleaning organic and plasma etched residues for semiconductor devices;

U.S. Pat. Nos. 6,187,730 and 6,221,818, both to Lee, which issued on Feb. 13, 2001 and on Apr. 24, 2001, respectively, entitled Hydroxylamine-gallic compound composition and process;

U.S. Pat. No. 6,156,661 to Small, which issued on Dec. 5, 2000, entitled Post clean treatment;

U.S. Pat. No. 6,140,287 to Lee, which issued on Oct. 31, 2000, entitled Cleaning compositions for removing etching residue and method of using;

U.S. Pat. No. 6,121,217 to Lee, which issued on Sep. 19, 2000, entitled Alkanolamine semiconductor process residue removal composition and process;

U.S. Pat. No. 6,117,783 to Small et al., which issued on Sep. 12, 2000, entitled Chemical mechanical polishing composition and process;

U.S. Pat. No. 6,110,881 to Lee et al., which issued on Aug. 29, 2000, entitled Cleaning solutions including nucleophilic amine compound having reduction and oxidation potentials;

U.S. Pat. No. 6,000,411 to Lee, which issued on Dec. 14, 1999, entitled Cleaning compositions for removing etching residue and method of using;

U.S. Pat. No. 5,981,454 to Small, which issued on Nov. 9, 1999, entitled Post clean treatment composition comprising an organic acid and hydroxylamine;

U.S. Pat. No. 5,911,835 to Lee et al., which issued on Jun. 15, 1999, entitled Method of removing etching residue;

U.S. Pat. No. 5,902,780 to Lee, which issued on May 11, 1999, entitled Cleaning compositions for removing etching residue and method of using;

U.S. Pat. No. 5,891,205 to Picardi et al., which issued on Apr. 6, 1999, entitled Chemical mechanical polishing composition;

U.S. Pat. No. 5,672,577 to Lee, which issued on Sep. 30, 1997, entitled Cleaning compositions for removing etching residue with hydroxylamine, alkanolamine, and chelating agent;

U.S. Pat. No. 5,482,566 to Lee, which issued on Jan. 9, 1996, entitled Method for removing etching residue using a hydroxylamine-containing composition;

U.S. Pat. No. 5,399,464 to Lee, which issued on Mar. 21, 1995, entitled Triamine positive photoresist stripping composition and post-ion implantation baking;

U.S. Pat. No. 5,381,807 to Lee, which issued on Jan. 17, 1995, entitled Method of stripping resists from substrates using hydroxylamine and alkanolamine;

U.S. Pat. No. 5,334,332 to Lee, which issued on Aug. 2, 1994, entitled Cleaning compositions for removing etching residue and method of using;

U.S. Pat. No. 5,279,771 to Lee, which issued on Jan. 18, 1994, entitled Stripping compositions comprising hydroxylamine and alkanolamine;

U.S. Pat. No. 4,824,763 to Lee, which issued on Apr. 25, 1989, entitled Triamine positive photoresist stripping composition and prebaking process; and U.S. Pat. No. 4,395,348 to Lee, which issued on Jul. 26, 1983, entitled Photoresist stripping composition and method.

The entire disclosures of all of which EKC publications are incorporated herein for all purposes by express reference thereto. These compositions have achieved substantial success in integrated circuit fabrication applications.

Compositions and methods for planarizing or polishing the surface of a substrate, especially for chemical-mechanical polishing (CMP), are well known in the art. Polishing compositions (also known as polishing slurries) typically contain an abrasive material in an aqueous solution and are applied to a surface by contacting the surface with a polishing pad saturated with the polishing composition. Typical abrasive materials include silicon oxide, cerium oxide, aluminum oxide, zirconium oxide, and tin oxide. Alternatively, the abrasive material may be incorporated into the polishing pad. U.S. Pat. No. 5,489,233 discloses the use of polishing pads having a surface texture or pattern, and U.S. Pat. No. 5,958,794 discloses a fixed abrasive polishing pad. All references, including publications, patent applications, and patents, cited herein are hereby incorporated by reference to the same extent as if each reference were individually and specifically indicated to be incorporated by reference and were set forth in its entirety herein.

SUMMARY OF THE INVENTION

The invention includes in one embodiment a method of providing an alumina abrasive slurry useful for forming chemical mechanical polishing slurries, the method comprising the steps of:

A) providing fumed gamma alumina particles formed by a reduced-temperature fuming process comprising oxidizing in a flame a gas mixture comprising alumina-and-halogen-containing gas, oxygen, hydrogen, and a quenching gas in an amount sufficient to reduce the maximum flame temperature measured in degrees Centigrade to an amount less than 95% of the maximum temperature experienced with the same mixture of alumina-and-halogen-containing gas and oxygen but without the quenching gas, wherein the fumed gamma alumina particles have a pre-milling average particle size $D_{50}$ between about 0.06 μm and about 0.25 μm;

B) forming a pre-slurry comprising water and between 5% and 50% by weight fumed gamma particles;

C) wet-milling the alumina pre-slurry under conditions such that the post-milled pre-slurry comprises:

a liquid component comprising water, from about 10 ppm to about 40 ppm of the halogen of the alumina-and-halogen-containing-gas per one weight percent alumina, and less than about 2000 ppm of total nitrate; and a solid component of fumed gamma alumina particles having an average particle size $D_{50}$ between about 60% and 80% of the pre-milling particle size $D_{50}$, and having a $D_{99.9}$ particle size that is less than about seven times the post-milling particle size $D_{50}$; and D) adjusting the water content and adding a pH-adjusting compound to form an alumina abrasive slurry having a solid component comprising from about 0.4% to 24% by weight fumed gamma alumina particles based on the weight of the slurry and having a liquid component having a pH of between about 1.5 to about 6.8. In an alternate embodiment the gamma alumina itself has a chloride content of between 10 and 40 ppm based on weight of the gamma alumina.

In an alternate embodiment the alumina-and-halogen-containing gas comprises $AlX_3$, wherein X is a halogen selected from chloride, fluoride, or mixture thereof, and wherein the maximum flame temperature is about 400° C. to about 850° C. In an alternate embodiment the quenching gas comprises at least one of water vapor, a noble gas, or nitrogen, and wherein the maximum flame temperature is about 600° C. to about 800° C., and wherein the amount of halogen, that is leached from the gamma alumina, in the liquid component of the wet-milled pre-slurry is between about 18 ppm to about 34 ppm of the total of chloride and/or fluoride per one weight percent alumina. In an alternate embodiment the gamma alumina itself has a chloride content of between 18 and 34 ppm based on weight of the gamma alumina. In an alternate embodiment the pre-milling average particle size $D_{50}$ is between about 0.1 μm and about 0.2 μm, and wherein the liquid component of the pre-slurry comprises less than about 2000 ppm of the sum of weights of dissolved nitrate, sulfate, and phosphate. In an alternate embodiment the liquid component of the alumina abrasive slurry comprises less than about 4000 ppm total of dissolved salts, acids, and bases, and has a pH of between about 3 to about 6, and wherein the gamma alumina has a specific surface area between about 50 $m^2/g$ and about 160 $m^2/g$. In an alternate embodiment the liquid component of the alumina abrasive slurry comprises between about 100 ppm and about 1000 ppm of the sum of weights of dissolved nitrate, sulfate, and phosphate, and wherein the gamma alumina has a specific surface area between about 80 $m^2/g$ and about 120 $m^2/g$. In an alternate embodiment the liquid component of the alumina abrasive slurry comprises less than about 600 ppm total of aluminum nitrate and ammonium nitrate. In an alternate embodiment the liquid component of the alumina abrasive slurry comprises between about 100 ppm and about 600 ppm of dissolved sulfate, and less than about 4000 ppm total of dissolved salts, acids, and bases, and wherein the gamma alumina has a specific surface area between about 50 m2/g and about 160 $m^2/g$. In an alternate embodiment the alumina abrasive slurry comprises between about 100 ppm and about 600 ppm of dissolved phosphate, and wherein the gamma alumina has a specific surface area between about 50 $m^2/g$ and about 160 $m^2/g$. The invention also encompasses any combination of the above embodiments, including other combinations of embodiments disclosed herein insofar as the requirements of each of the combined embodiments are compatible one with another, and also encompasses the product made by the above-described embodiments.

The invention includes in one embodiment a method of providing an alumina abrasive slurry useful for forming chemical mechanical polishing slurries, the method comprising the steps of:

A) providing fumed gamma alumina particles formed by a reduced-temperature fuming process comprising oxidizing in a flame a gas mixture comprising alumina-and-halogen-containing gas, oxygen, hydrogen, and a quenching gas in an amount sufficient to reduce the maximum flame temperature measured in degrees Centigrade to an amount less than 95% of the maximum temperature experienced with the same mixture of alumina-and-halogen-containing gas and oxygen but without the quenching gas, wherein the fumed gamma alumina particles have a pre-milling average particle size $D_{50}$ between about 0.06 μm and about 0.25 μm;

B) forming a pre-slurry having a liquid component comprising water and between 0.2% and 10% of dissolved salts which function as milling additives, and a solid component comprising between 5% and 50% by weight fumed gamma particles;

C) wet-milling the alumina pre-slurry under conditions to reduce the fumed gamma alumina particles average particle size $D_{50}$ to between about 50% and 80% of the pre-milling particle size $D_{50}$, wherein the post-milling particles have an average particle size $D_{99.9}$ that is less than about four times the post-milling particle size $D_{50}$ and have an average specific surface area between about 50 $m^2/g$ and about 160 $m^2/g$, wherein the liquid component of the alumina pre-slurry after wet milling comprises from about 10 ppm to about 40 ppm of total dissolved chloride and/or fluoride, which was leached from the alumina, per one weight percent alumina in the pre-slurry;

D) removing at least a portion of dissolved salts such that the total concentration of salts is less than about 4000 ppm, preferably less than 2000 ppm;

E) adjusting the water content and adding a pH-adjusting compound to form an alumina abrasive slurry comprising from about 0.4% to 24% by weight fumed gamma alumina particles and having a pH of between about 1.5 to about 6.8. In an alternate embodiment the gamma alumina itself has a chloride content of between 20 and 34 ppm based on weight of the gamma alumina, regardless of the quantity leached.

In an alternate embodiment the alumina-and-halogen-containing gas comprises $AlX_3$, wherein X is a halogen selected from chloride, fluoride, or mixture thereof, wherein the maximum flame temperature is about 400° C. to about 850° C., wherein the quenching gas comprises at least one of water vapor, a noble gas, or nitrogen, and wherein the amount of halogen, that is leached from the gamma alumina, in the liquid component of the wet-milled pre-slurry is between about 18 ppm to about 34 ppm of the total of chloride and/or fluoride per one weight percent alumina. In an alternate embodiment the gamma alumina itself has a chloride content of between 20 and 34 ppm based on weight of the gamma alumina, regardless of the quantity leached. In an alternate embodiment the pre-milling average particle size $D_{50}$ is between about 0.1 μm and about 0.2 μm and wherein the post-milling gamma alumina has a specific surface area between about 80 $m^2/g$ and about 120 $m^2/g$, and wherein the liquid component of the alumina abrasive slurry comprises less than about 2000 ppm total of dissolved salts, acids, and bases, and has a pH of between about 3 to about 6. In an alternate embodiment the liquid component of the alumina abrasive slurry comprises between about 100 ppm and about 1000 ppm of the sum of weights of dissolved nitrate, sulfate, and phosphate, and less than about 600 ppm total of aluminum nitrate and ammonium nitrate. The removing of dissolved salts can be by any means known in the art, including for example ion exchange. However, simple washing/rinsing can be very effective, especially if the pH of the washing solution is at or near the isoelectric point of the gamma alumina, and if metal-containing additives such as aluminum nitrate are used if the washing solution comprises chelators. Washing/rinsing requires separating solids from liquids, which can be difficult by gravity settling as the preferred slurries are fairly stable and do not settle over a short period of time. Filtering and/or centrifuging are therefore preferred methods of separating the gamma alumina particles from the milling solution (the liquid component of the milled slurry) and/or from the washing/rinsing liquids. Centrifuging, filtering, or both may in alternate embodiments be enhanced by adding one or more polar organic solids to the slurry and/or washing/rinsing liquids in an amount sufficient to lower the viscosity of the liquid, change the interfacial tension, and/or disrupt boundary layers. Centrifuging will provides a column of solid, with entrained liquid, and this entrained liquid will tend to be carried along with the gamma alumina. Therefore, multiple washing and centrifugal separation steps may be required to remove all the salts from the gamma alumina. A benefit of centrifuging is that the particle size of the retained gamma alumina can be easily refined and narrowed by 1) discarding (e.g., sending back to the milling step) the first fraction (e.g., 1%, 5%, or 10%, for example) of settled solids, as these solids will contain a proportionately high fraction of particles with a size greater than the average size, 2) discarding (or diverting for use in a slurry requiring finer particles) the last fraction of particles to settle (and also by necessity the particles that do not settle), as these solids will contain a proportionately high fraction of particles with a size lower than the average size, or 3) both of the above. Generally, slurries with a narrower particle size distribution are desired. Filtering and washing/rinsing is straightforward and more efficient in removing salts, though if a filter cake forms the cake will trap even very small particles and therefore not provide an easy mechanism to narrow the particle size distribution. Certain filtering techniques, for example using a rotating drum filter that is regularly cleaned to prevent the formation of filter cake, can be useful to separate out particles too small to be caught by the filter. Any combination of filtering and/or centrifuging is envisioned as embodiments of this invention. The invention also encompasses any combination of the above embodiments, including other combinations of embodiments disclosed herein insofar as the requirements of each of the combined embodiments are compatible one with another, and also encompasses the product made by the above-described embodiments.

The invention includes in one embodiment a method of chemically mechanically polishing a substrate comprising the steps of:

A) providing a polishing slurry comprising:
an oxidizer;
a diluent; and
a fumed gamma alumina abrasive, wherein the fumed gamma alumina is formed by a reduced-temperature fuming process and is then wet-milled, wherein prior to wet-milling the fumed gamma alumina has an average particle size $D_{50}$ between about 0.06 μm and about 0.25 μm, and wherein the wet-milled fumed gamma alumina abrasive has an average $D_{50}$ between about 60% and 80% of the prior to wet-milling $D_{50}$ particle size, a $D_{99.9}$ particle size that is less than about seven times the $D_{50}$ particle size of the milled alumina, and an average specific surface area from about 50 $m^2/g$ and about 160 $m^2/g$;

B) providing a substrate having a surface comprising a metal, a metal-containing material, or both; and C) movably contacting the slurry with the surface under conditions where a portion of the metal, metal-containing material, or both is removed.

In an alternate embodiment the substrate comprises at least one of copper, aluminum, or tungsten; wherein the fumed gamma alumina is formed by oxidizing a mixture comprising $AlCl_3$ and/or AlF3, oxygen, and quenching gas in an amount sufficient to maintain the maximum flame temperature to from about 400° C. to about 850° C., and wherein the fumed gamma alumina comprises at least 99% gamma alumina by weight, compared to the total weight of the alumina abrasive; and wherein the slurry has substantially no wet-milling salt additive. In an alternate embodiment the gamma alumina is formed by a partially quenched fumed process run at a temperature from about 600° C. to about 800° C., wherein the gamma alumina has a specific surface area from about 80 m²/g and about 120 m²/g. In an alternate embodiment the diluent comprises of water, and wherein the step of providing the polishing slurry comprises providing a gamma alumina slurry comprising water and gamma alumina abrasive, providing an oxidizer in an aqueous solution, and mixing together the gamma alumina slurry and the aqueous oxidizer solution. In an alternate embodiment the gamma alumina slurry comprises from about 0.1% to about 25% by weight fumed gamma alumina abrasive, and wherein the chloride content of the gamma alumina slurry is from about 20 ppm to about 34 ppm per weight percent gamma alumina in the gamma alumina slurry. In an alternate embodiment the gamma alumina itself has a chloride content of between 20 and 34 ppm based on weight of the gamma alumina, regardless of the quantity leached. In an alternate embodiment the gamma alumina itself has a chloride content of between 20 and 34 ppm based on weight of the gamma alumina. In an alternate embodiment the gamma alumina slurry consists essentially of gamma alumina, water, and from about 0.0001% to about 0.2% by weight of acid sufficient to provide a pH of the alumina slurry between about 3 and about 6. In an alternate embodiment the gamma alumina slurry comprises gamma alumina, water, and from about 0.0001% to about 0.1% by weight of acid sufficient to provide a pH of the alumina slurry between about 3.6 and about 4.4, and wherein the mixing together the gamma alumina slurry and the aqueous oxidizer solution occurs at point of use. The invention also encompasses any combination of the above embodiments, including other combinations of embodiments disclosed herein insofar as the requirements of each of the combined embodiments are compatible one with another.

The invention includes in one embodiment a method of chemically mechanically polishing a substrate comprising the steps of:

providing an alumina slurry comprising a diluent and a fumed gamma alumina abrasive material, wherein the fumed gamma alumina is formed by a reduced-temperature fuming process, and wherein the recovered fumed gamma alumina has a specific surface area between about 80 m2/g and about 120 m2/g and has a D50 particle size between about 0.06 µm and about 0.25 µm, which recovered fumed gamma alumina is subsequently milled to reduce its aggregates into smaller aggregates such that the milled gamma alumina has an average D50 particle size between about 60% and 80% of the original D50 particle size prior to milling and such that the milled gamma alumina has an average D99.9 particle size that is less than about seven times the D50 particle size of the milled alumina, and wherein the milling is a wet milling process in which substantially no milling additive is used;

mixing a polishing accelerator into the alumina slurry at point of use to form a polishing slurry;

providing a substrate having a surface comprising a dielectric material and a metal, a metal-containing material, or both; and movably contacting the slurry with the surface under conditions where a portion of the substrate is removed.

In an alternate embodiment the alumina slurry comprises water, gamma alumina, and one or more of phosphoric acid, sulfuric acid, and nitric acid. In an alternate embodiment the alumina slurry consists essentially of water, gamma alumina, and one or more of phosphoric acid, sulfuric acid, and nitric acid. In an alternate embodiment the substrate comprises copper, tungsten, or both. The invention also encompasses any combination of the above embodiments, including other combinations of embodiments disclosed herein insofar as the requirements of each of the combined embodiments are compatible one with another.

The invention includes in one embodiment a method of chemically mechanically polishing a substrate comprising the steps of:

providing a polishing slurry comprising an oxidizer, a diluent, and a fumed gamma alumina abrasive material, wherein the fumed gamma alumina is formed by a reduced-temperature fuming process, and wherein the recovered fumed gamma alumina has a D50 particle size between about 0.06 µm and about 0.25 µm, which recovered filmed gamma alumina is subsequently milled to reduce its aggregates into smaller aggregates such that the milled gamma alumina has an average D50 particle size between about 60% and 80% of the original D50 particle size prior to milling and such that the milled gamma alumina has an average D99.9 particle size that is less than about seven times the D50 particle size of the milled alumina, and wherein the milling is a wet milling process in which a milling additive salt is added and is then subsequently substantially removed from the polishing slurry;

providing a substrate having a surface comprising a metal, a metal-containing material, or both; and movably contacting the slurry with the surface under conditions where a portion of the metal, metal-containing material, or both is removed. The invention also encompasses any combination of this embodiment with other described embodiments disclosed herein insofar as the requirements of each of the combined embodiments are compatible one with another.

The invention includes in one embodiment a method of chemically mechanically polishing a substrate comprising the steps of:

providing a polishing slurry comprising an oxidizer, a diluent, and a fumed gamma alumina abrasive material, wherein the fumed gamma alumina is formed by a reduced-temperature fuming process, and wherein the recovered fumed gamma alumina has a D50 particle size between about 0.06 µm and about 0.25 µm, which recovered fumed gamma alumina is subsequently milled to reduce its aggregates into smaller aggregates such that the milled gamma alumina has an average D50 particle size between about 60% and 80% of the original D50 particle size prior to milling and such that the milled gamma alumina has an average D99.9 particle size that is less than about seven times the D50 particle size of the milled alumina, and wherein the milling is a wet milling process in which no wet-milling additive salt is added;

providing a substrate having a surface comprising a metal, a metal-containing material, or both; and movably contacting the slurry with the surface under conditions where a portion of the metal, metal-containing material, or both is removed. The invention also encompasses any combination of this embodiment with other described embodiments disclosed herein insofar as the requirements of each of the combined embodiments are compatible one with another.

The invention includes in one embodiment a method of chemically mechanically polishing a substrate comprising the steps of:

providing an alumina slurry comprising a diluent and a fumed gamma alumina abrasive material, wherein the fumed gamma alumina is formed by a reduced-temperature fuming process, and wherein the recovered fumed gamma alumina has a specific surface area between about 80 m2/g and about 120 m2/g and has a D50 particle size between about 0.06 μm and about 0.25 μm, which recovered fumed gamma alumina is subsequently milled to reduce its aggregates into smaller aggregates such that the milled gamma alumina has an average D50 particle size between about 60% and 80% of the original D50 particle size prior to milling and such that the milled gamma alumina has an average D99.9 particle size that is less than about seven times the D50 particle size of the milled alumina, and wherein the milling is a wet milling process in which a milling additive is used and is not substantially removed from the milled abrasive product;

mixing a polishing accelerator into the alumina slurry at point of use to form a polishing slurry;

providing a substrate having a surface comprising a dielectric material and a metal, a metal-containing material, or both; and movably contacting the slurry with the surface under conditions where a portion of the substrate is removed. The invention also encompasses any combination of this embodiment with other described embodiments disclosed herein insofar as the requirements of each of the combined embodiments are compatible one with another.

The invention includes in one embodiment a method of chemically mechanically polishing a substrate comprising the steps of:

providing an alumina slurry comprising a diluent and a fumed gamma alumina abrasive material, wherein the fumed gamma alumina is formed by a reduced-temperature fuming process, and wherein the recovered fumed gamma alumina has a specific surface area between about 80 m2/g and about 120 m2/g and has a D50 particle size between about 0.06 μm and about 0.25 μm, which recovered fumed gamma alumina is subsequently milled to reduce its aggregates into smaller aggregates such that the milled gamma alumina has an average D50 particle size between about 60% and 80% of the original D50 particle size prior to milling and such that the milled gamma alumina has an average D99.9 particle size that is less than about seven times the D50 particle size of the milled alumina, and wherein the milling is a wet milling process in which a milling additive is used and is substantially removed from the milled abrasive product before the milled abrasive product is added to the polishing slurry;

mixing a polishing accelerator into the alumina slurry at point of use to form a polishing slurry;

providing a substrate having a surface comprising a dielectric material and a metal, a metal-containing material, or both; and movably contacting the slurry with the surface under conditions where a portion of the substrate is removed.

The invention includes in one embodiment methods of manufacturing alumina abrasive for use in chemical mechanical polishing are described, wherein the abrasive is in a slurry having gamma alumina formed in a low temperature fuming process, water, an acid sufficient to maintain the pH below about 7, wherein the slurry does not settle appreciably in an 8 to 24 hour period. Advantageously, the alumina is wet-milled without the use of wet-milling salt additives.

The invention includes a method to chemical mechanical polishing of a substrate, wherein the substrate comprises a metal or metal-containing compound, and the process includes adding a plurality of the abrasive alumina particles of this invention to a polishing slurry and contacting the slurry to the surface of the substrate under conditions such that controlled chemical mechanical polishing occurs.

The alumina abrasive can be useful on all substrates, especially those described herein, but is especially preferred for use on substrates comprising copper and/or tungsten.

The alumina abrasive of this invention is predominantly a gamma alumina, e.g., formed by a fumed process. The fraction of gamma alumina in the alumina abrasive is typically at least about 80%, preferably at least about 90%, more preferably at least about 99%, e.g., about 100%, by weight compared to the total weight of the alumina abrasive.

The gamma alumina is a high purity fumed alumina that can be made by a fume plasma arc process, advantageously at lower temperature than other fume processes. Typically, fume plasma arc processes run at about 900° C. to 1100° C. As used herein, the term "flame" and "arc" are used interchangeably and each encompasses traditional flames, plasma arcs, and other constructs wherein oxidation of an alumina-containing gas occurs at an elevated temperature of greater than 400° C. and within a prescribed volume. The gamma alumina of this invention is advantageously formed by a partially quenched fuming process that can be run at a temperature from about 400° C. to about 850° C., for example between about 600° C. and about 800° C. In one embodiment $AlCl_3$ is passed through an arc with a gas of $H_2$ vapor and $O_2$, advantageously with a substantially inert gas such as $H_2O$, a noble gas, or in some embodiments simply nitrogen in an amount sufficient to cool the flame, where the $AlCl_3$ can be oxidized, e.g., to form $HClO_3$ and an $Al_2O_3$ product with a higher Cl content than is normally found in higher temperature fuming processes. The gamma alumina so formed can advantageously have a $D_{50}$ particle size (according to analysis on a Horiba LA910 particle size analyzer) from about 0.06 μm to about 0.25 μm, preferably between about 0.1 μm and about 0.2 μm, for example between about 0.13 μm and about 0.15 μm, and a $D_{99.9}$ particle size (according to analysis on a Horiba LA910 particle size analyzer) from about 0.2 μm to about 1.5 μm, for example between about 0.7 μm and about 1 μm. $D_{xx}$, as used herein, should be understood to represent the particle size below which at least about XX % of the particles exhibit, within the distribution of particle sizes. For example, $D_{50}$ can represent the weight mean particle size, while $D_{99.9}$ represents the minimum particle size exhibited by about 99.9% by weight of the particles. When no subscript is identified, the diameter corresponds to $D_{50}$.

The fumed alumina can, in some embodiments, have an irregular shape, and can then be advantageously milled and sized to provide a more uniform product. The alumina powder can advantageously be wet-milled, which process breaks down the agglomerates/aggregates/larger particle sizes in the slurry, thus resulting in a lower mean particle size for the product. The preferred method of milling is using a horizontal mill with ceramic beads in an amount sufficient to reduce the aggregates into smaller aggregates of alumina particles.

Generally, it is advantageous to add between 0.5% to about 5% of a salt, for example ammonium nitrate, aluminum nitrate, nitric acid, or mixture thereof, to a slurry to be wet-milled as this aids milling and slurry handling. In wet milling processes, a milling additive is generally present, e.g., in concentrations of as low as about 0.1% to as high as about 5% by weight. For instance, the milling additive can be present in concentrations from about 0.5% to about 4%, or from about 1% to about 4%, by weight. Typically, this milling additive can include a metallic compound (e.g., a nitrate such as $AlNO_3$), a non-metallic compound (e.g., a nitrate such as $NH_4NO_3$), or a combination thereof. Also typically, this milling additive is not removed and is substantially included in the abrasive isolated after milling. In one embodiment, the alumina abrasive according to the invention can be milled using a wet milling process that incorporates a milling additive that is substantially not removed.

One major advantage of including a milling additive in a milling process is to facilitate quicker, more controllable (particle size distribution), and/or more complete (smaller average particle size) milling of the abrasive. We have surprisingly found, however, one major disadvantage of the milling additive is that its presence in the abrasive, and thus in the polishing slurry according to the invention, can cause settling, increase the amount of settling, and/or quicken the rate of settling of the abrasive in the polishing slurry.

The preferred embodiments of the invention are milled with substantially free of nitrates during milling. By substantially free it is meant the slurry has less than about 0.5% by weight nitrates, preferably less than about 0.2% nitrates, for example less than 0.05% nitrates or no added nitrates. In one embodiments sulfates can be added, but again, the preferred slurry contains than about 0.5% by weight sulfates, preferably less than about 0.1% sulfates, for example less than 0.05% sulfates or no added sulfates. In another embodiments phosphates can be added, but again, the preferred slurry contains than about 0.5% by weight phosphates, preferably less than about 0.1% phosphates, for example less than 0.05% phosphates or no added phosphates. In one embodiment, the total concentration of salts, which can include nitrates, sulfates, phosphates, or mixture thereof, in an aqueous slurry of the alumina abrasive is between about 100 ppm and about 600 ppm, for example between about 200 ppm and 400 ppm. We have found that wet milling in the absence of added salts, while creating more difficulties with handling, provides a polishing slurry having better settling characteristics, e.g., substantially no settling in a shift and less than about 20% of solids settled in an unstirred tank in 2 days.

Therefore, in alternate wet milling processes, the milling additive can be substantially removed from the abrasive after milling but before the abrasive is included in the polishing slurry according to the invention. This removal of the milling additive can be accomplished by methods known to those in the art, e.g., single or multiple centrifugation and rinsing steps. The advantage of removal of the milling additive can advantageously counteract the settling problem of milling additive-containing polishing slurries, thus effectively eliminating settling, decreasing the amount of settling, and/or slowing the rate of settling of the abrasive in the polishing slurry. Thus, in another embodiment, the alumina abrasive according to the invention can be milled using a wet milling process that incorporates a milling additive that is substantially removed before addition of the abrasive to the polishing slurry according to the invention. In an embodiment of this alternate method, the slurry can be wet-milled with one or more salt additives, where a subsequent washing process which involves for example filtration and/or centrifugation is used to subsequently remove the majority of salts. Such washes, as are known in the art, may include adding small quantities of acids and/or bases to lower the zeta potential and to disrupt boundary layers around particles.

In another alternate wet milling process, substantially no milling additive is used, e.g., such that the milling process occurs only on abrasive in a diluent medium (e.g., water). While such a wet milling process can take longer to attain reductions in average particle size and/or narrowing or broadening of particle size distributions than in wet milling processes containing a milling additive, counteracting the disadvantage of settling, as described above, in polishing slurries can be even more advantageous. Thus, in another embodiment, the alumina abrasive according to the invention can be milled using a wet milling process that incorporates substantially no milling additive.

Even in this embodiment, washing which involves filtration and/or centrifugation can also remove milling fines which are sub-sized particles, creating a typically desirable tighter particle size distribution in the finished product.

The alumina in the slurry post-wet-milling can advantageously have an average $D_{50}$ between about 60% and about 80% of the original $D_{50}$ prior to milling, with the average $D_{99.9}$ preferably being less than about seven times, more preferably less than 5 times, for example less than 3 times, the average $D_{50}$ of the milled abrasive.

This alumina can advantageously have a specific surface area between about 50 $m^2/g$ and about 160 $m^2/g$, for example between about 80 $m^2/g$ and about 120 $m^2/g$ or of about 100 $m^2/g$.

We have surprisingly found that this alumina exhibits a hardness and/or texture that provides superior substrate removal rates/uniformity compared to conventional fumed alumina abrasives.

The alumina abrasive described herein can be used as a component of a CMP slurry. The amount of gamma alumina in a CMP slurry can be from about 0.01% to about 25%, but is preferably from about 0.1% to about 10%, for example from about 0.5% to about 5%, by weight compared to the weight of the slurry. Advantageously the alumina can be contained in an alumina slurry that is admixed with other components, for example an oxidizer, at point of use, although the alumina can be stable in a premixed slurry that also comprises oxidizers and optionally chelators, rheological agents, surfactants, corrosion inhibitors, and the like. When the alumina slurry is mixed with other components at point of use to form a CMP slurry, it is advantageous for the alumina slurry prior to mixing comprise or consist essentially of water and between about 0.0001% and about 0.1% by weight of acid, e.g., nitric acid, compared to the weight of the alumina slurry prior to point of use mixing. Generally, the amount of acid is sufficient to provide a slurry pH from about 1.5 to about 6.8, for example between about 3 and about 6 or between about 3.6 and about 4.4.

The chloride content of the alumina slurry, for example after wet-milling, is dependent on the amount of alumina in the slurry, and is typically from about 10 ppm to about 40 ppm, e.g., about 18 ppm and about 34 ppm, per one weight percent alumina in the alumina slurry. Therefore, in one preferred embodiment there can be between about 180 ppm and about 260 ppm chlorine in a 10% alumina slurry. This amount is substantially higher than is typically found in other fumed alumina slurries. In an alternate embodiment the gamma alumina itself has a chloride content of between 10 and 40 ppm, or between 18 and 34 ppm, based on weight of the gamma alumina, regardless of the quantity leached. Further, preferably this amount of chloride reflects on the composition of the alumina, as a portion (generally most) of this chloride is dissolved from the solid matrix during handling and milling operations, and it reflects a higher amount of chlorides present in the solid than is present in prior art fumed alumina. Of course, in alternate embodiments with washing steps the amount of chlorides can be adjusted up or down.

In one embodiment, the total concentration of nitrates, sulfates, phosphates, or mixture thereof in an aqueous slurry of the alumina abrasive is between about 100 ppm and about 600 ppm, for example between about 200 ppm and 400 ppm. Alternately or additionally, the total concentration of inorganic acids excluding chlorides, for example acids of nitrates, sulfates, phosphates, or mixture thereof, in an aqueous slurry of the alumina abrasive is between about 100 ppm and about 2000 ppm, for example between about 400 ppm and 1500 ppm.

The use of the alumina slurry is to provide the abrasive material particularly tailored for chemical mechanical polishing of substrates such as semiconductors, magnetic and/or optical read or read/write heads, hard disk or other memory storage medium, as well as for polishing optical glass or material used in optics including fiber optics. Specific examples and alternate embodiments of the invention are discussed below.

DETAILED DESCRIPTION OF THE PREFERRED EMBODIMENTS

The invention comprises a method of chemically mechanically polishing a substrate, for example material that will be formed into a semiconductor, a magnetic or optical read or read/write head, a hard disk or other memory storage medium, optical glass or fiber optic devices, comprising the steps of:

providing a polishing slurry comprising, consisting essentially of, or consisting of water, a polishing accelerator which is typically one or more oxidizers, and an alumina abrasive material as described herein;

providing a substrate having a surface comprising at least one of a metal, a metal compound such as metal nitrides, a metal oxide, and/or a dielectric material; and movably contacting the polishing slurry with the surface under conditions where a portion of the substrate is removed by a chemical mechanical polishing process. In one embodiment, the step of providing the polishing slurry comprises providing an alumina slurry, providing an oxidizer, and mixing the two, optionally with water, at point of use.

An alumina slurry according to the invention can comprise, consist essentially, or consist of alumina abrasive, an agent to control pH (e.g., an organic or inorganic acid or base), and water.

A preferred alumina slurry composition contains about 10% gamma-alumina; not more than about 0.2% of nitrates including nitric acid, not more than about 340 ppm chloride content and/or not less than about 150 ppm chloride content, and the balance (about 90%) water. In an alternate embodiment the gamma alumina itself has a chloride content of between 150 and 340 ppm. This alumina slurry composition does not include an oxidizer, but a proprietary oxidizer solution can be, and preferably is, added separately at the point of use. Advantageously, the pH of the slurry composition can range from about 3.6 to about 4.4, or can be, for example, about 4.

The slurry may additionally comprise other abrasives. Other such abrasive particles include, but are not limited to, colloidal silica, fumed silica, colloidal ceria, fumed ceria, colloidal alumina, zirconia, titania, and/or metal-coated or polymer-coated particles thereof (e.g., iron-coated silica).

The alumina is preferably substantially gamma- and/or fused alumina, more preferably fused gamma-alumina. The process used to form the fused alumina according to the invention into substantially the gamma phase is a plasma arc fuming process performed at a lower temperature than conventional fuming processes. The plasma arc fuming process begins by exposing aluminum chloride (e.g., $AlCl_3$) to a mixture of water and oxygen gas causing an oxidation reaction to form chloric acid ($HClO_3$) and ultimately yielding a fused alumina particle having a higher chlorine content than in conventional alumina formation processes. Alternatively, the aluminum chloride (e.g., $AlCl_3$) may be exposed to hydrogen gas, water and oxygen gas and mixtures thereof.

In alternate embodiments, a portion or all of the $AlCl_3$ can be replaced with $AlF_3$, providing a gamma alumina with an elevated fluorine content instead of an elevated chloride content. In either event, the gamma alumina preferably has an elevated halide content.

The specific surface area of the alumina can range from about 25 $m^2/g$ to about 500 $m^2/g$, preferably from about 40 $m^2/g$ to about 300 $m^2/g$, for example from about 40 $m^2/g$ to about 150 $m^2/g$, from about 50 $m^2/g$ to about 250 $m^2/g$, from about 75 $m^2/g$ to about 175 $m^2/g$, from about 100 $m^2/g$ to about 300 $m^2/g$, or from about 80 $m^2/g$ to about 120 $m^2/g$.

The amount of abrasive, e.g., alumina, in the slurry composition according to the invention can range from about 0.1% to about 30% by weight, preferably from about 0.1% to about 15%, e.g., from about 0.1% to about 5%, from about 5% to about 15%, from about 1% to about 10%, from about 8% to about 12%, from about 1% to about 7%, from about 0.1% to about 1%, or from about 0.5% to about 3%.

When present in the slurry composition, the alumina particles generally form aggregates that can have an average diameter (or median diameter, $D_{50}$) from about 0.02 microns to about 0.4 microns, for example from about 0.03 to about 0.3 microns, alternately from about 0.03 microns to about 0.15 microns, from about 0.1 microns to about 0.2 microns, from about 0.15 microns to about 0.3 microns, from about 0.05 microns to about 0.25 microns, from about 0.05 microns to about 0.14 microns, or from about 0.08 to about 0.2 microns. The aggregates formed can additionally or alternately have a particle size distribution such that substantially all the alumina aggregates have maximum diameters or sizes of at most about 2 microns, preferably at most about 1 micron, for example at most about 0.9 microns, at most about 0.7 microns, or at most about 0.5 microns. In one embodiment, the $D_{99.9}$ of the alumina aggregates is at most about 2 microns, preferably at most about 1 micron, for example at most about 0.9 microns, at most about 0.7 microns, or at most about 0.5 microns. This means that, in this embodiment, no more than about 0.1% by weight of the alumina aggregates have diameters or sizes greater than about 2 microns, preferably greater than about 1 micron, for example greater than about 0.9 microns, greater than about 0.7 microns, or greater than about 0.5 microns. The advantages of these size ranges are known in the art, as various size ranges are known to be useful for various densities of substrates, e.g., what degree of scratching is unacceptable, and what rate of substrate removal is desired.

The slurry composition according to the invention also advantageously includes a majority of a diluent. While this diluent is preferably aqueous and more preferably consists essentially of, or consists of, water, it is also contemplated that the diluent can include other relatively non-reactive organic solvents. Examples of such solvents include, but are not limited to, pyrrolidinones such as N-methylpyrrolidinone, sulfoxides such as dimethylsulfoxide, sulfones such as methyl sulfone, amides such as lactams or dimethylacetamide, esters such as lactones, ethers such as tetrahydrofuran, glycols such as propylene glycol, and the like, and combinations thereof. In a preferred embodiment, the slurry composition according to the invention is substantially free of organic solvents.

The slurry composition according to the invention also advantageously includes a sufficient amount of a pH-controlling agent. In general, the pH of the slurry composition according to the invention can be adjusted in any suitable manner, e.g., by adding a pH adjuster, regulator, or buffer. Nitric acid is the preferred pH control agent, though sulfuric acid, phosphoric acid, or any combination of these 3 can be used. Organic acids, including mono, di, and tri carboxylic acids, including for example citric acid, glycolic acid, oxalic acid, acetic acid, or any combination thereof can be used in place of or with the inorganic acids. Organic acids (and salts thereof, for example ammonium salts thereof, provide a desirable buffering capacity to the alumina slurry. Suitable pH buffers can include acids, for example, mineral acids (e.g., nitric acid, sulfuric acid, phosphoric acid, and the like, and combinations thereof), organic acids (e.g., acetic acid, citric acid, malonic acid, succinic acid, tartaric acid, oxalic acid, glycolic acid, and the like, and combinations thereof), and combinations thereof. Other suitable pH adjusters, regulators, or buffers can also include bases, for example, inorganic hydroxide bases (e.g., sodium hydroxide, potassium hydroxide, ammonium hydroxide, and the like), organic hydroxide bases (e.g., mono-, di-, tri-, or tetra-alkylammonium hydroxides, choline hydroxides, bis-choline hydroxide, tris-choline hydroxide, and the like, and combinations thereof), carbonate bases (e.g., sodium carbonate and the like), methyl methoxide, ammonia, and combinations thereof.

The pH of the alumina slurry composition will generally be acidic, e.g., less than about 7. In one embodiment, the pH of the slurry composition can preferably be from about 1.5 to about 6.8, for example from about 1.5 to about 3, from about 5 to about 6.8, from about 2 to about 6, from about 2 to about 4, from about 4 to about 6, from about 3 to about 5, or from about 3.5 to about 4.7.

The abrasive particles in the slurry composition according to the invention can form aggregates, especially when placed in aqueous solutions, even without an oxidizer present in the solution. It is generally undesirable, however, to have the aggregates precipitate or settle out of solution relatively quickly. In one embodiment, the aggregation of the abrasive particles was not able to be observed visually, but was found to occur (e.g., by light scattering analysis) after at least about 18 hours, for example after at least about 24 hours, after about 24 to 48 hours, after at least about 30 hours, after at least about 36 hours, after at least about 42 hours, or after at least about 48 hours of the placement of the abrasive particles in the slurry composition. In another embodiment, the aggregation of the abrasive particles was found to occur (e.g., by light scattering analysis) within about 96 hours, for example within about 84 hours, within about 72 hours, within about 60 hours, or within about 48 hours of the placement of the abrasive particles in the slurry composition. In a preferred embodiment aggregate formation resulting in settling does not occur for more than 5% of the solids, preferably no more than 1% of the solids, in 48 hours.

The slurry composition according to the invention can be used in conjunction with any suitable component(s) (or ingredient(s)) known in the art, which may be present in the slurry composition or may be contained separately to be admixed therewith at the point of use. Examples of other components/ingredients can include, but are not limited to, other non-gamma-alumina abrasives, oxidizing agents, non-hydroxyl-containing amines, hydroxyl-containing amines such as alkanolamines, catalysts, film-forming agents (e.g., corrosion inhibitors), complexing agents (e.g., chelating agents), rheological control agents, surfactants (e.g., surface-active agents), polymeric stabilizers, bases or other acids to control pH, and other appropriate ingredients, as well as combinations thereof. However, in some embodiments, the slurry composition can consist essentially of, or consist of, abrasive particles, a pH controlling agent, and a diluent and/or can be substantially free from one or more of the other components or ingredients listed above. The term "substantially," as used herein, unless otherwise defined, means at least about 99%, preferably at least about 99.5%, more preferably at least about 99.9%, for example at least about 99.99%. In a preferred embodiment, the term "substantially" can mean completely, or about 100%. Therefore, the terms "substantially no" and "substantially free from," as used herein, means having not more than about 1%, preferably not more than about 0.5%, more preferably not more than about 0.1%, for example not more than about 0.01%. In a preferred embodiment, the terms "substantially no" and "substantially free from" can mean completely no and completely free from, respectively, or having about 0% of, the particular component(s)/ingredient(s).

Optionally, but preferably, the slurry composition according to the invention can be admixed with a separate oxidizing solution, and optionally an additional diluent, to form a CMP slurry admixture. The separate oxidizing solution advantageously contains an oxidizing agent in a desired amount, preferably the particular agent and particular amount being tailored to the specific substrate material to be planarized/polished and to the specific desired removal rate of that specific substrate material. The separate oxidizing solution also generally contains a diluent, although this may not be necessary if a diluent is enclosed and/or added separately to the CMP slurry admixture. In such a case, the separate oxidizing solution and/or the optional diluent, may contain one or more other components/ingredients, as disclosed above. However, in some embodiments, the separate oxidizing solution can consist essentially of, or consist of, merely an oxidizing agent and an optional diluent and/or the diluent can contain no other components/ingredients. Similarly, in some embodiments, the CMP slurry admixture can consist essentially of, or consist of, the slurry composition according to the invention, a separate oxidizing solution, and optionally a diluent.

Any suitable oxidizing agent can be used in conjunction with the present invention, e.g., in the oxidizing solution. Suitable oxidizing agents include, for example, oxidized halides (e.g., chlorates, bromates, iodates, perchlorates, perbromates, periodates, fluoride-containing compounds, and the like, and mixtures thereof), per-compounds (e.g., perboric acid, periodic acid, periodates, perborates, percarbonates, persulfates such as ammonium persulfate, peroxides, peroxyacids (e.g., peracetic acid, perbenzoic acid, m-chloroperbenzoic acid, salts thereof, mixtures thereof, and the like), permanganates, and the like, and mixtures thereof), nitrates (e.g., iron (III) nitrate, hydroxylamine nitrate, and the like, and mixtures thereof), chromates, cerium compounds, ferricyanides (e.g., potassium ferricyanide), mixtures thereof, hydroxylamine, hydroxylamine derivatives and/or salts (e.g., N-methyl-hydroxylamine, N,N-dimethyl-hydroxylamine, N-ethyl-hydroxylamine, N,N-diethyl-hydroxylamine, methoxylamine, ethoxylamine, N-methyl-methoxylamine, as well as salts of hydroxylamine or hydroxylamine derivatives such as sulfate salts, nitrate salts, carbonate salts, phosphate salts, acetate salts, and the like, and a combination thereof). Suitable oxidizing agents can include mixtures of two or more of the above-listed oxidizers, for example, in a ratio of from about 100:1 to about 1:100. The amount of oxidizer is typically between 0.1% and 25% by weight, e.g., 1% to 7% by weight, compared to the weight of the polishing slurry.

The polishing slurry and also the alumina slurry may contain chelators. Examples of chelating agents include, but in no way limited to, mono-, di-, or multi-hydroxybenzene-type compounds, e.g., such as catechol, resorcinol, butylated hydroxytoluene ("BHT"), and the like, or a combination thereof. In one embodiment the chelators include three or more carboxylic acid-containing moieties, e.g., such as ethylenediaminetetraacetic acid ("EDTA"), non-metallic EDTA salts (e.g., mono-, di-, tri-, or tetra-ammonium EDTA, or the like), and the like, or a combination thereof. Compounds containing a two carboxylic acid moieties are less preferred. Compounds containing both hydroxyl and carboxylic acid moieties are useful in one embodiment. Aromatic compounds containing thiol groups, e.g., such as thiophenol; amino-carboxylic acids; diamines, e.g., such as ethylene diamine; polyalcohols; polyethylene oxide; polyamines; polyimines; or a combination thereof, are useful in one embodiment. In one embodiment, one or more chelating agents can be used in one composition, where the chelating agents are selected from groups described above. Alternately or additionally, some chelating agents are described in U.S. Pat. No. 5,417,877, issued May 23, 1995 to Ward, and in commonly assigned U.S. Pat. No. 5,672,577, issued Sep. 30, 1997 to Lee, the disclosures of each of which are incorporated herein by reference. In one embodiment, a chelating agent is present in the solution according to the invention in an amount from about 0.1% to about 10%, alternately from about 1% to about 10%, from about 0.5% to about 5%, from about 0.5% to about 3%, from about 0.1% to about 2%, from about 0.25% to about 0.75%, or from about 1% to about 3%. In an alternate embodiment, the composition is substantially free from chelating agents.

Optionally, the slurry can contain a surfactant, for example an epoxy-polyamide compound present in the solution in an amount from about 0.01% to about 3%, for example from about 0.1% to about 0.5% by weight. In an alternate embodiment, the composition is substantially free from surfactants.

Advantageously, the alumina slurry is substantially free of dissolved metals, especially transition metals, for example the slurry contains less than about 50 ppm, preferably less than about 10 ppm dissolved metals.

The preferred diluent is water. In some embodiments, between about 10% and about 100% of the water can be replaced with one or more polar organic solvents. Organic solvents may be either polar or non-polar. Generally, non-polar organic solvents are not preferred, though polar organic solvents, such as high boiling alcohols and the like, may be used. In one embodiment, therefore, the slurry according to the invention can be substantially free from non-polar organic solvents. Examples of polar organic solvents for the composition according to the invention include, but are in no way limited to, dimethyl sulfoxide, ethylene glycol, organic acid alkyl (e.g., $C_1$-$C_6$) esters such as ethyl lactate, ethylene glycol alkyl ethers, diethylene glycol alkyls ethers (e.g., monomethyl ether, monoethyl ether, monopropyl ether, monobutyl ether, etc.; dimethyl ether, diethyl ether, dipropyl ether, dibutyl ether, etc.; methyl ethyl diether, methyl propyl diether, methyl butyl diether, ethyl propyl diether, ethyl butyl diether, propyl butyl diether, etc., and the like), triethylene glycol alkyl ethers, propylene glycol, propylene glycol alkyl ethers, dimethyl sulfoxide, N substituted pyrrolidones such as N-methyl-2-pyrrolidone (NMP), sulfolanes, dimethylacetamide, and the like, water (considered a polar organic solvent herein), or any combination thereof. Dimethylacetamide and diethylene glycol alkyl ethers (most notably diethylene glycol monobutyl ether) are preferred polar organic solvents. Others include amine compounds and/or alkanolamine compounds, e.g., two carbon atom linkage alkanolamines such as AEEA and the like.

In one embodiment where polar organic solvents are present, the boiling point of the polar organic solvent(s) is(are) at least about 85° C., alternately at least about 90° C. or at least about 95° C. Care must be taken because, in the absence of alkanolamines and the like, certain organic solvents may be only slightly miscible with water, if present, in the dilute fluoride solution according to the invention. In one embodiment, at least one polar organic solvent is present in the polishing slurry, and/or in the alumina slurry, in a total amount of at least about 75% by weight solvent(s), preferably at least about 85% by weight, for example at least about 90% by weight or at least about 95% by weight. In another embodiment, the total amount of polar organic solvent(s) can be from about 75% to about 99% by weight, alternately from about 90% by to about 95% by weight or from about 96% to about 99% by weight.

The slurry compositions and/or CMP slurry admixtures according to the invention can be used in conjunction with any suitable substrate. In particular, the present invention can be used in conjunction with, inter alia, memory or rigid disks, metals (e.g., noble metals), interlayer dielectric constructs (ILDs), integrated circuits, semiconductor devices, semiconductor wafers, micro-electro-mechanical systems (MEMS), ferroelectrics, magnetic heads, piezoelectrics, polymeric films, and low and high dielectric constant (e.g., low-K and high-K) films, technical or optical glass, or some combination thereof. Suitable substrates comprise, for example, a metal, metal oxide, metal composite, or mixtures thereof. The substrate can comprise, consist essentially of, or consist of any suitable metal. Suitable metals include, for example, copper, aluminum, titanium, tungsten, tantalum, gold, platinum, iridium, ruthenium, and combinations (e.g., alloys or mixtures) thereof. The substrate also can comprise, consist essentially of, or consist of any suitable metal oxide. Suitable metal oxides include, for example, alumina, silica, titania, ceria, zirconia, germania, magnesia, and co-formed products thereof, and mixtures thereof. In addition, the substrate can comprise, consist essentially of, or consist of any suitable metal composite and/or metal alloy. Suitable metal composites and metal alloys include, for example, metal nitrides (e.g., tantalum nitride, titanium nitride, and tungsten nitride), metal carbides (e.g., silicon carbide and tungsten carbide), nickel-phosphorus, alumino-borosilicate, borosilicate glass, phosphosilicate glass (PSG), borophosphosilicate glass (BPSG)), silicon/germanium alloys, and silicon/germanium/carbon alloys. The substrate also can comprise, consist essentially of, or consist of any suitable semiconductor base material. Suitable semiconductor base materials can include single-crystal silicon, poly-crystalline silicon, amorphous silicon, silicon-on-insulator, and gallium arsenide. Glass substrates can also be used in conjunction with the present invention including, but not limited to, technical glass, optical glass, and ceramics, of various types known in the art.

The slurry compositions and/or CMP slurry admixtures according to the invention are particularly useful on substrates comprising, consisting essentially of, or consisting of copper, a copper alloy, and/or a copper compound, and the substrate may also contain one or more barrier materials as are known in the art, such as Ta, TaN, Ti, TiN, or combinations thereof.

The slurry compositions and/or CMP slurry admixtures according to the invention can be used to polish any part of a substrate (e.g., a semiconductor device) at any stage in the production of the substrate. For example, the present invention can be used to polish a semiconductor device in conjunction with shallow trench isolation (STI) processing, as set forth, for example, in U.S. Pat. Nos. 5,498,565, 5,721,173, 5,938,505, and 6,019,806, or in conjunction with the formation of an interlayer dielectric.

Another aspect of the invention relates to a method for chemically mechanically planarizing or polishing a metal-containing, e.g., a copper-containing, substrate that includes contacting the substrate with the slurry composition and/or the CMP slurry admixture according to the invention for a time and at a temperature sufficient to planarize, polish, or clean a metal-containing (e.g., copper-containing and/or tungsten-containing) surface thereof.

The method of CMP can include contacting the substrate with the slurry composition and/or the CMP slurry admixture according to the invention under movable conditions, where the slurry composition and/or CMP slurry admixture is typically between the substrate and a pad that move relative to one another, in order to polish and/or planarize the substrate material.

Any suitable polishing pad can be used in conjunction with the present invention. In particular, the polishing pad can be woven or non-woven and can comprise any suitable polymer of varying density, hardness, thickness, compressibility, ability to rebound upon compression, and compression modulus. The polishing pad used in conjunction with the present invention can preferably have a density from about 0.6 to about 0.95 g/cm$^3$, a Shore A hardness rating of less than about 100 (e.g., about 40 to about 90), a thickness of at least about 0.75 mm (e.g., about 0.75 to about 3 mm), compressibility of about 0 to about 10% (by volume), the ability to rebound to at least about 25% (by volume) (e.g., about 25% to about 100%) after compression at about 35 kPa, and/or a compression modulus of at least about 1000 kPa. Examples of suitable polymers for the polishing pad material can include, but are not limited to, polyurethanes, polymelamines, polyethylenes, polyesters, polysulfones, polyvinyl acetates, polyacrylic acids, polyacrylamides, polyvinylchlorides, polyvinylfluorides, polycarbonates, polyamides, polyethers, polystyrenes, polypropylenes, nylons, fluorinated hydrocarbons, and the like, and mixtures, copolymers, and grafts thereof. In one preferred embodiment, the polishing pad comprises a polyurethane polishing surface. The polishing pad and/or surface can be formed from such materials using suitable techniques recognized in the art, for example, using thermal sintering techniques. Furthermore, the polishing pad formed from such materials can be substantially porous (e.g., having open or closed pores) or substantially non-porous. Porous pads preferably have a pore diameter of about 1 to 1000 microns and a pore volume of about 15% to about 70%. The polishing pad and/or surface also can be perforated or unperforated to any degree. In another preferred embodiment, the polishing pad can comprise a perforated polishing surface.

Although the present invention is described with reference to certain preferred embodiments, it is apparent that modification and variations thereof may be made by those skilled in the art without departing from the spirit and scope of this invention as defined by the appended claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of materials, methods, and components otherwise used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed:

1. A method of preparing an alumina abrasive slurry comprising the steps of:
    A) passing a composition comprising $AlX_3$ through a flame produced from a hydrogen and oxygen gas mixture, wherein the flame has a flame temperature;
    B) mixing the composition comprising $AlX_3$ with an inert quenching gas in an amount sufficient to cool the flame temperature to a temperature that is less than 95% of a maximum flame temperature attainable by the $AlX_3$ and the hydrogen and oxygen gas mixture without the inert quenching gas; and
    C) admixing water with the resulting fumed alumina particles, which are present as fumed gamma alumina in a yield of at least about 80% by weight, to form a pre-slurry comprising water and between 5% and 50% by weight of the fumed gamma particles; wherein the fumed gamma alumina particles have a pre-milled average particle size $D_{50}$ between about 0.06 μm and about 0.2 μm.

2. The method of claim 1, wherein X in the $AlX_3$ is a halogen selected from chloride, fluoride, or mixture thereof.

3. The method of claim 1, wherein the quenching gas comprises at least one of water vapor, a noble gas, or nitrogen.

4. The method of claim 1, wherein the pre-milled average particle size $D_{50}$ is between about 0.1 μm and about 0.2 μm.

5. The method of claim 1, wherein the fumed gamma alumina comprises a chloride content in the range from 150 to 340 ppm.

6. The method of claim 1, wherein the flame temperature is between 400° C. to 850° C.

7. The method of claim 1, wherein the flame temperature is between about 600° C. and about 800° C.

8. The method of claim 1 further comprising:
    A) wet-milling the pre-slurry under conditions such that the post-milled pre-slurry comprises:
        a liquid component comprising water, from about 10 ppm to about 40 ppm of the composition per one weight percent alumina, and less than about 2000 ppm of total nitrate; and
        a solid component of fumed gamma alumina particles having an average particle size $D_{50}$ between about 60% and about 80% of the pre-milling particle size $D_{50}$, and having a $D_{99.9}$ particle size that is less than about seven times the post-milling particle size $D_{50}$; and
    B) adjusting the water content and adding a pH-adjusting compound to form an alumina abrasive slurry having a solid component comprising from about 0.4% to about 24% by weight fumed gamma alumina particles based on the weight of the slurry and having a liquid component having a pH of between about 1.5 to about 6.8.

9. The method of claim 8 wherein the liquid component of the alumina abrasive slurry comprises less than about 4000 ppm total of dissolved salts, acids, and bases, and has a pH of between about 3 to about 6, and wherein the gamma alumina has a specific surface area between about 50 m²/g and about 160 m¹/g.

10. The method of claim 8 wherein the liquid component of the alumina abrasive slurry comprises between about 100 ppm and about 1000 ppm of the sum of weights of dissolved nitrate, sulfate, and phosphate, and wherein the gamma alumina has a specific surface area between about 80 m²/g and about 120 m²/g.

11. The method of claim 8 wherein the liquid component of the alumina abrasive slurry comprises less than about 600 ppm total of aluminum nitrate and ammonium nitrate.

12. The method of claim 8 wherein the liquid component of the alumina abrasive slurry further comprises between about 100 ppm and about 600 ppm of dissolved sulfate, and less than about 4000 ppm total of dissolved salts, acids, and bases, and wherein the gamma alumina has a specific surface area between about 50 m²/g and about 160 m²/g.

13. The method of claim 8 wherein the alumina abrasive slurry further comprises between about 100 ppm and about 600 ppm of dissolved phosphate, and wherein the gamma alumina has a specific surface area between about 50 m²/g and about 160 m²/g.

14. The method of claim 8, wherein the post-milling gamma alumina has a specific surface area between about 80 m²/g and about 120 m²/g, and wherein the liquid component of the alumina abrasive slurry comprises less than about 2000 ppm total of dissolved salts, acids, and bases, and has a pH of between about 3 to about 6.

15. The method of claim 8 wherein the liquid component of the alumina abrasive slurry comprises between about 100 ppm and about 1000 ppm of the sum of weights of dissolved nitrate, sulfate, and phosphate, and less than about 600 ppm total of aluminum nitrate and ammonium nitrate.

16. The method of claim 8, wherein the liquid component further comprises from about 10 ppm to about 40 ppm of total dissolved chloride and/or fluoride, which was leached from the alumina, per one weight percent alumina in the pre-slurry.

17. The method of claim 16 further comprising removing at least a portion of the dissolved salts from the liquid component such that the total concentration of salts is less than about 4000 ppm.

18. The method of claim 17 wherein the removing of dissolved salts comprises contacting the liquid portion of the milled pre-slurry with an ion exchange resin.

19. The method of claim 17 wherein the removing of dissolved salts comprises substantially separating the particles from the liquid component comprising the dissolved salts by filtering the slurry, and washing/rinsing the particles with a washing/rinsing liquid.

20. The method of claim 19, wherein the washing/rinsing liquid has a pH that is within 0.3 pH units of the isoelectric pH point of the gamma alumina.

21. The method of claim 19 comprising adding a polar organic solvent to the pre-slurry, to the washing/rinsing liquid, or to both.

22. The method of claim 17 wherein the removing of dissolved salts comprises substantially separating the particles from the liquid component comprising the dissolved salts by centrifuging the slurry, and washing/rinsing the particles with a washing/rinsing liquid.

23. The method of claim 22 wherein the washing/rinsing liquid has a pH that is within 0.3 pH units of the isoelectric pH point of the gamma alumina.

24. The method of claim 22 comprising adding a polar organic solvent to the pre-slurry, to the washing/rinsing liquid, or to both.

25. The method of claim 22 further comprising removing a fraction of the gamma alumina particles to narrow the particle size distribution of the retained gamma alumina particles.

* * * * *

UNITED STATES PATENT AND TRADEMARK OFFICE
CERTIFICATE OF CORRECTION

PATENT NO. : 7,344,988 B2  Page 1 of 1
APPLICATION NO. : 10/972616
DATED : March 18, 2008
INVENTOR(S) : Philippe Chelle It is certified that error appears in the above-identified patent and that said Letters Patent is hereby corrected as shown below:

In column 21, line 3, correct the last line of claim 9 to read:

--and about 160 $m^2/g$.--

Signed and Sealed this

Fourteenth Day of October, 2008

JON W. DUDAS
*Director of the United States Patent and Trademark Office*